(12) United States Patent
Vaisenberg

(10) Patent No.: US 11,722,034 B2
(45) Date of Patent: Aug. 8, 2023

(54) LINEAR GENERATOR

(71) Applicant: Netanel Vaisenberg, Chorzeszów (PL)

(72) Inventor: Netanel Vaisenberg, Chorzeszów (PL)

( * ) Notice: Subject to any disclaimer, the term of this patent is extended or adjusted under 35 U.S.C. 154(b) by 38 days.

(21) Appl. No.: 17/019,262

(22) Filed: Sep. 13, 2020

(65) Prior Publication Data

US 2020/0412200 A1 Dec. 31, 2020

Related U.S. Application Data

(63) Continuation of application No. PCT/IL2019/050280, filed on Mar. 13, 2019.

(60) Provisional application No. 62/642,033, filed on Mar. 13, 2018.

(51) Int. Cl.
*H02K 7/06* (2006.01)
*H02K 7/106* (2006.01)
*B66B 11/04* (2006.01)
*H02K 7/18* (2006.01)
*H02K 47/02* (2006.01)

(52) U.S. Cl.
CPC .......... *H02K 7/106* (2013.01); *B66B 11/0407* (2013.01); *H02K 7/1869* (2013.01); *H02K 47/02* (2013.01)

(58) Field of Classification Search
CPC ......... B21C 37/15; B21C 37/16; B21D 41/02; B21D 41/026; H02K 41/031; H02K 47/02; H02K 7/106; H02K 7/1869; H04L 12/403; H04L 12/66; H04L 5/14; B66B 11/0407

See application file for complete search history.

(56) References Cited

U.S. PATENT DOCUMENTS

| 5,203,432 A * | 4/1993 | Grinaski .............. B66B 11/0055 187/404 |
| 9,078,090 B1 * | 7/2015 | Shahmoon ............ H04W 4/023 |
| 2008/0194261 A1 * | 8/2008 | Voyer .................... H04W 36/18 455/436 |
| 2012/0152659 A1 * | 6/2012 | Husmann .............. B66B 5/0087 187/373 |
| 2014/0137763 A1 * | 5/2014 | Brier ...................... B60L 50/51 318/376 |

(Continued)

FOREIGN PATENT DOCUMENTS

| DE | 19718840 | 10/1998 |
| EP | 0048847 | 4/1982 |
| EP | 0859965 | 8/1998 |

(Continued)

OTHER PUBLICATIONS

International Preliminary Report on Patentability dated Jun. 19, 2020 From the International Preliminary Examining Authority Re. Application No. PCT/IL2019/050280. (15 Pages).

(Continued)

*Primary Examiner* — Naishadh N Desai

(57) ABSTRACT

A linear generator for generating electrical power from momentum of a vehicle, comprises a moving part and a stator. The moving part is a powered vehicle moving along a defined path and the stator is built along the defined path. Examples are trains and elevators, and the linear generator may be used to help with braking and at the same time prevent waste of the energy from the vehicle momentum.

15 Claims, 20 Drawing Sheets
(6 of 20 Drawing Sheet(s) Filed in Color)

(56) References Cited

U.S. PATENT DOCUMENTS

2017/0233219 A1* 8/2017 Studer ................. B66B 1/365
                                                  187/247
2017/0267055 A1* 9/2017 Hanumalagutti ........ H02K 3/24

FOREIGN PATENT DOCUMENTS

| EP | 0858965 A1 | * | 10/2017 | |
|----|------------|---|---------|---|
| JP | H09100082 A | * | 9/1997 | |
| WO | WO 2010/042777 | | 4/2010 | |
| WO | WO-2010042777 A2 | * | 4/2010 | ............. B60L 5/005 |
| WO | WO 2015/137967 | | 9/2015 | |
| WO | WO 2015/137969 | | 9/2015 | |
| WO | WO-2015137969 A1 | * | 9/2015 | ......... B66B 11/0407 |
| WO | WO-2017093050 A1 | * | 6/2017 | ............... B66B 1/32 |
| WO | WO-2017175019 A1 | * | 10/2017 | ........... B66B 1/2408 |
| WO | WO 2019/175875 | | 9/2019 | |

OTHER PUBLICATIONS

International Search Report and the Written Opinion dated Jun. 3, 2019 From the International Searching Authority Re. Application No. PCT/IL2019/050280. (15 Pages).

Written Opinion dated Feb. 25, 2020 From the International Preliminary Examining Authority Re. Application No. PCT/IL2019/050280. (9 Pages).

* cited by examiner

LINEAR GENERATOR

RELATED APPLICATIONS

This application is a Continuation of PCT Patent Application No. PCT/IL2019/050280 having International filing date of Mar. 13, 2019, which claims the benefit of priority under 35 USC § 119(e) of U.S. Provisional Patent Application No. 62/642,033 filed on Mar. 13, 2018. The contents of the above applications are all incorporated by reference as if fully set forth herein in their entirety.

FIELD AND BACKGROUND OF THE INVENTION

The present invention, in some embodiments thereof, relates to a linear generator and, more particularly, but not exclusively, to the use of such a generator to generate electricity from momentum.

Vehicles, from trains to elevators, move in fixed paths with considerable amounts of momentum, and every time a vehicle slows down, such momentum is lost. There are two well-known systems for saving the energy from that momentum that are currently used in vehicles. One is the flywheel and the other is electromagnetic braking.

The flywheel is a large wheel with most of its mass around the circumference, which is widely used in buses that make frequent stops. The flywheel engages during braking and stores the vehicle momentum as angular momentum in the flywheel. Then when the bus starts again, the rotating flywheel reengages and returns the energy to accelerate the vehicle.

Electromagnetic braking is used in electric trains and electric cars and involves reversing the operation of the electric motor to operate as a generator and damp or brake the motion of the vehicle. Electromagnetic braking can be used to recharge batteries and make electrically powered transport more efficient.

However there are two limitations to electromagnetic braking. First of all, the electric motor uses a feedback system in order to work efficiently and the use of electromagnetic braking can unbalance the feedback system.

A second limitation is that electromagnetic braking requires making changes to the electromagnetic motor.

A more general limitation is that it is not applicable where the power source is not electrical, since there is no electrical source to which to return the power generated. Although non-electric vehicles generally have an accumulator and have on-board electronics, the energy and power levels relating to electromagnetic braking will generally overwhelm such systems.

SUMMARY OF THE INVENTION

The present embodiments provide a generator having a moving part and a stator, wherein the moving part is a vehicle and the stator is built into the travel path. The stator may then be connected to an electrical system without any reference to the vehicle. The generator may damp the motion of the vehicle and thus use the motion of the vehicle to generate electricity.

According to an aspect of some embodiments of the present invention there is provided a linear generator for generating electrical power from momentum of a vehicle, the linear generator comprising a moving part and a stator, wherein the moving part is a powered vehicle moving along a defined path and the stator is built along the defined path.

In an embodiment, the moving part comprises a sequence of magnets and the stator comprises wound coils.

In an embodiment, the magnets are electromagnets and the powered vehicle is an electrically powered vehicle.

In an embodiment, the sequence of magnets are arranged on the vehicle to pass over at a predetermined distance from the wound coils.

In an embodiment, the sequence of magnets are of alternating polarity.

In an embodiment, the defined path comprises braking regions and non-braking regions, and the stator is built into the braking regions and not built into the non-braking regions.

In an embodiment, the vehicle comprises a train and the defined path is a railway track.

In an embodiment, the vehicle is an elevator with a counterweight, and the defined path is an elevator shaft.

In an embodiment, the vehicle is an elevator counterweight and the defined path is an elevator shaft.

In an embodiment, the stator comprises an AC to DC convertor to provide a DC output.

In an embodiment, the stator comprises a frequency convertor to provide the stator output at a desired frequency.

In an embodiment, the moving part comprises a sequence of electromagnets and the stator comprises wound coils and the vehicle is configured to electrify the electromagnets when braking.

According to a second aspect of the present invention there is provided a train comprising a sequence of electromagnets on a side adjacent a track having wound coils, and configured to electrify the electromagnets when braking to damp motion of the train.

According to a third aspect of the present invention there is provided a railway track having braking regions and wound coils in the braking regions to help brake passing trains.

According to a fourth aspect of the present invention there is provided an elevator and counterweight system in an elevator shaft, wherein the elevator or the counterweight comprise electromagnets and the elevator shaft has coils, and wherein the elevator is controllable to electrify the electromagnets when braking, thereby to provide electromagnetic braking of the elevator and counterweight system.

According to a fifth aspect of the present invention there is provided a method of generating electricity and braking a vehicle at the same time, the method comprising:

applying braking to a moving vehicle;

at least as part of the applying braking, electrifying electromagnets on the vehicle which are located adjacent coils on a track; and extracting electricity from the coils.

According to a sixth aspect of the present invention there is provided a method of manufacture of a vehicle for running on a track, the method comprising:

providing the vehicle for running on a track;

providing on the vehicle on a side adjacent the track a sequence of electromagnets; and connecting the electromagnets to be energized upon application of braking on the vehicle.

According to a seventh aspect of the present invention there is provided a method of manufacture of a track for a vehicle; the method comprising:

identifying braking regions on the track where braking is likely to be required;

placing wound coils on the braking regions; and connecting the coils to output electricity generated therein.

In this aspect the method may comprise setting the coils at a height defining a predetermined distance from corresponding magnets placed on a vehicle intended for travel on the track, and connecting an AC to DC converter between the coils and the output. The method may further comprise connecting a DC to AC converter between the AC to DC converter and the output.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a conceptual schematic diagram showing a linear generator made of a vehicle moving along a track, with a stator built into the track according to embodiments of the present invention;

FIG. 2 is a schematic diagram showing a side perspective view of the underside of a vehicle on a track according to the present embodiments;

FIG. 3 is a simplified schematic diagram showing a front perspective view of the underside of the vehicle of FIG. 2;

FIG. 4 is a simplified schematic diagram showing the stator of FIGS. 2 and 3 without the track;

FIG. 5 is a schematic diagram showing a track having identifiable braking regions for the placement of stator windings according to embodiments of the present invention;

FIG. 6 is a simplified diagram of an elevator and counterweight for braking using the linear generator principle of the present embodiments;

FIG. 7 is a variation of the elevator and counterweight of FIG. 6;

FIG. 8 is a further variation of the elevator and counterweight of FIG. 6;

FIG. 9A is a schematic diagram showing how the counterweight for an elevator may be constructed of coils and surrounded by magnets to provide the linear generator of the present embodiments;

FIG. 9B is a schematic diagram showing a further view of an exemplary elevator according to the present embodiments.

FIG. 10 is a simplified flow chart showing a method of braking a vehicle according to embodiments of the present invention;

Figure 11:
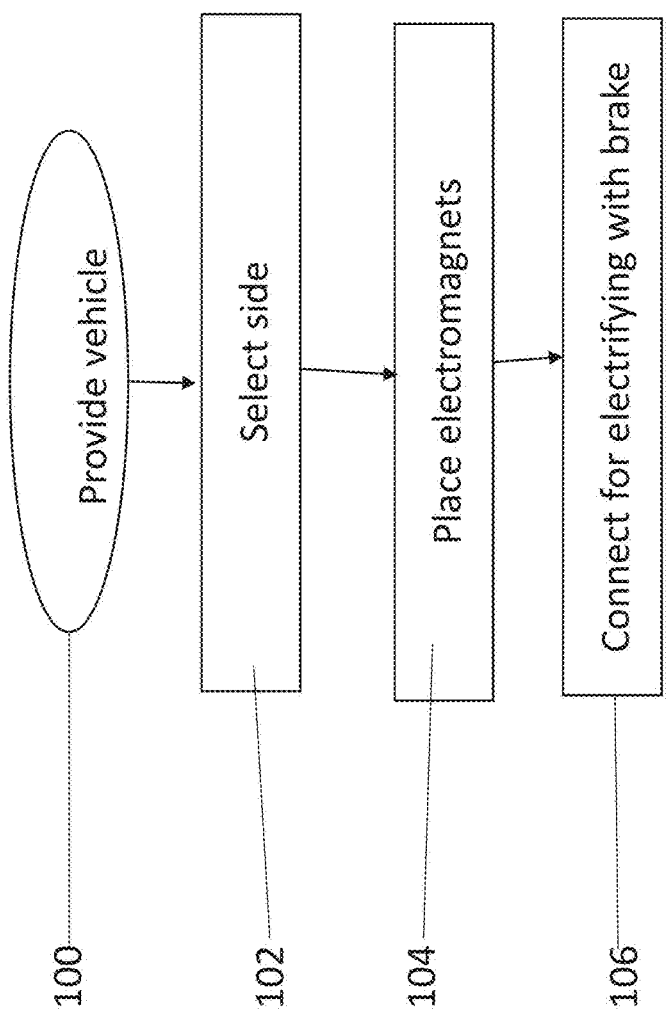
Figure 12:
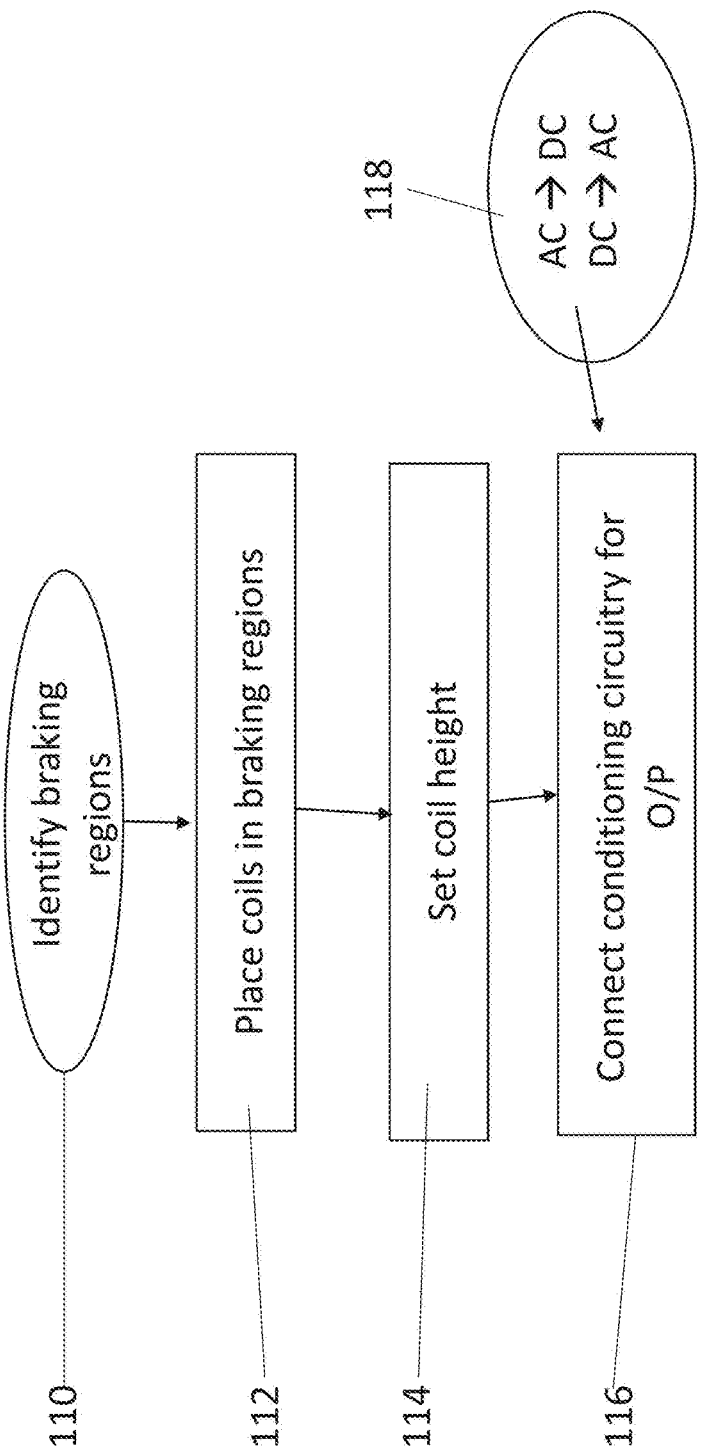

FIG. 11 is a simplified flow chart showing manufacture of a vehicle for use in embodiments of the present invention; and FIG. 12 is a simplified flow chart showing manufacture or conversion of track for use in embodiments of the present invention.

Figure 13:
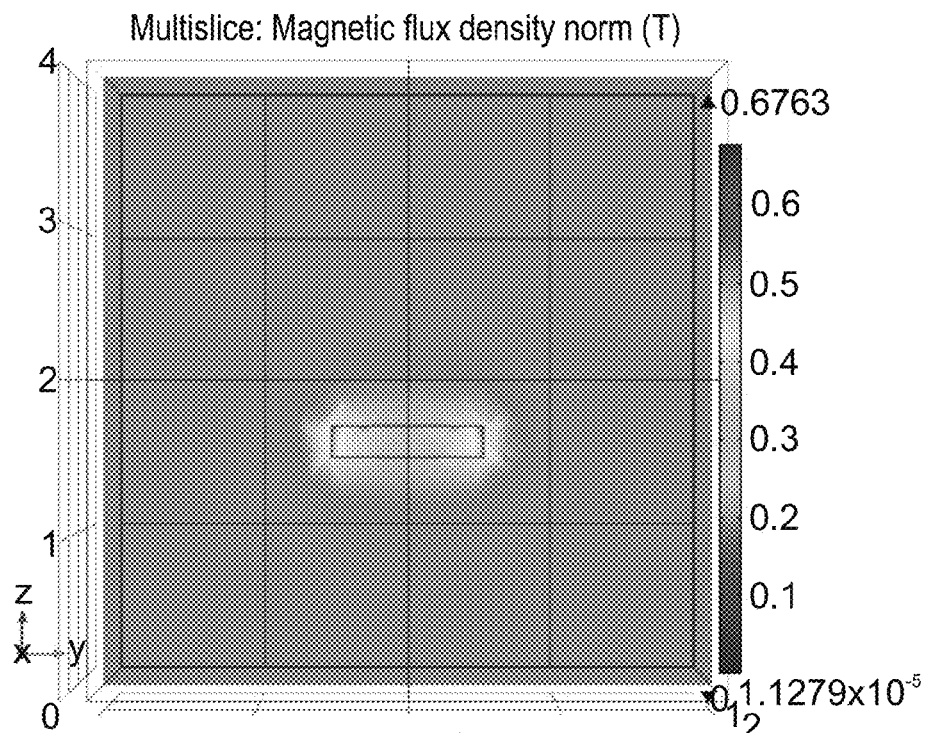
Figure 14:
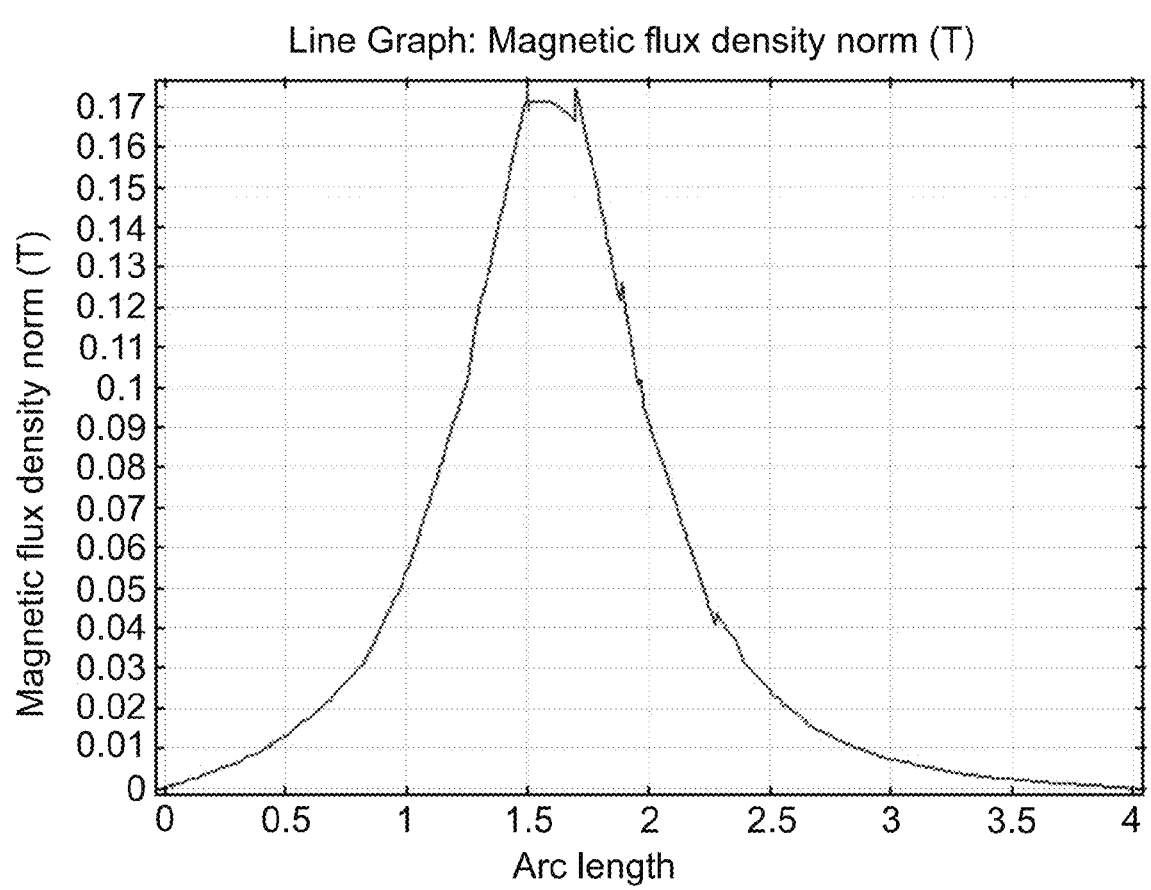
Figure 15:
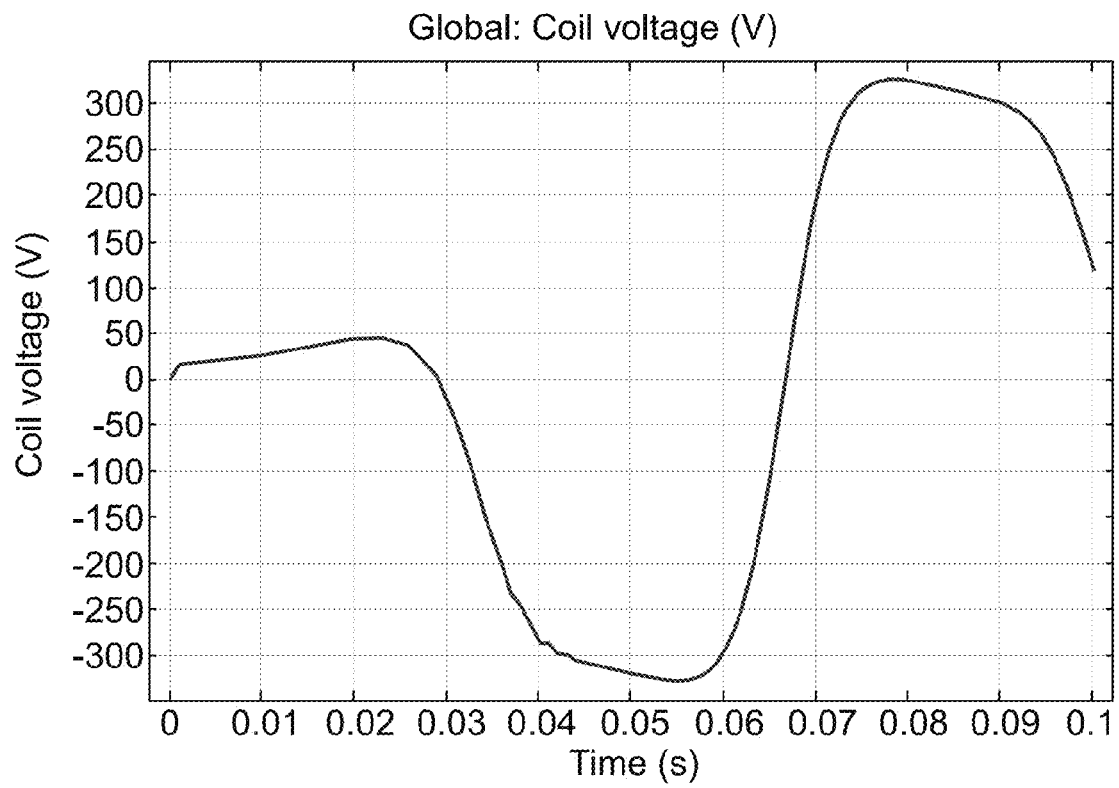
Figure 16:
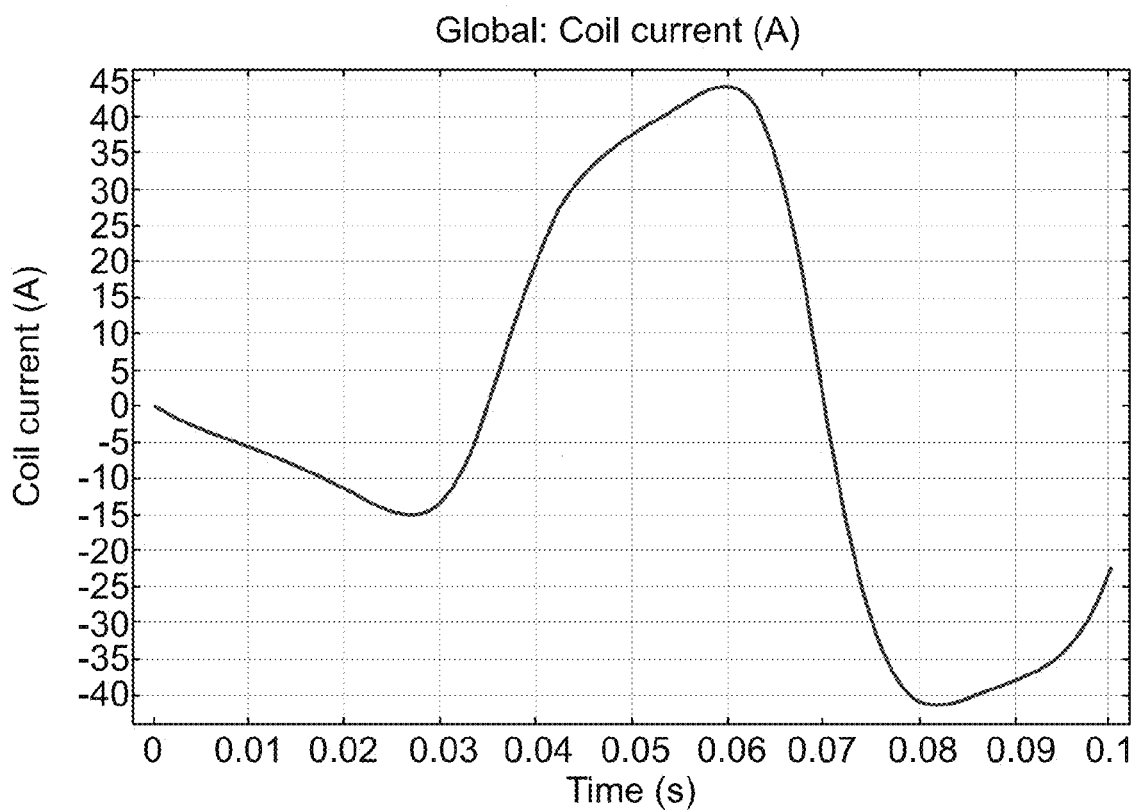
Figure 17:
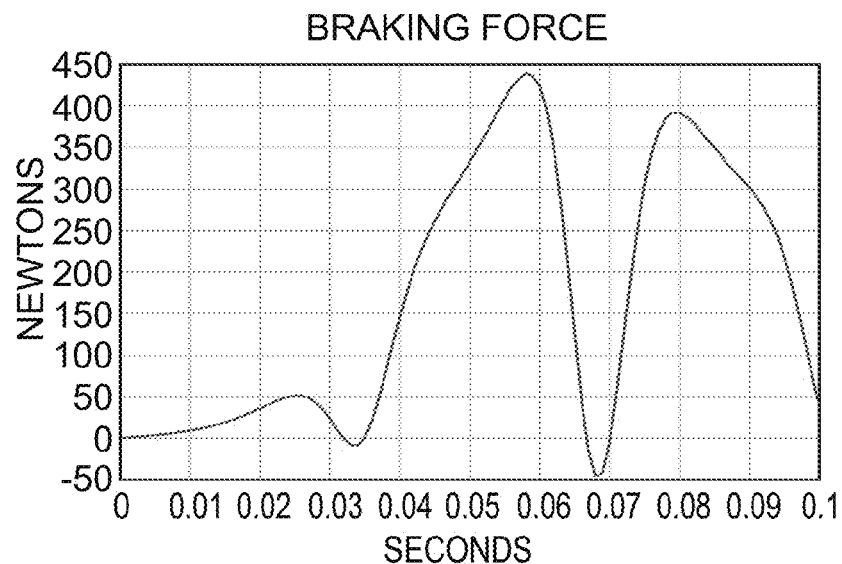
Figure 18:
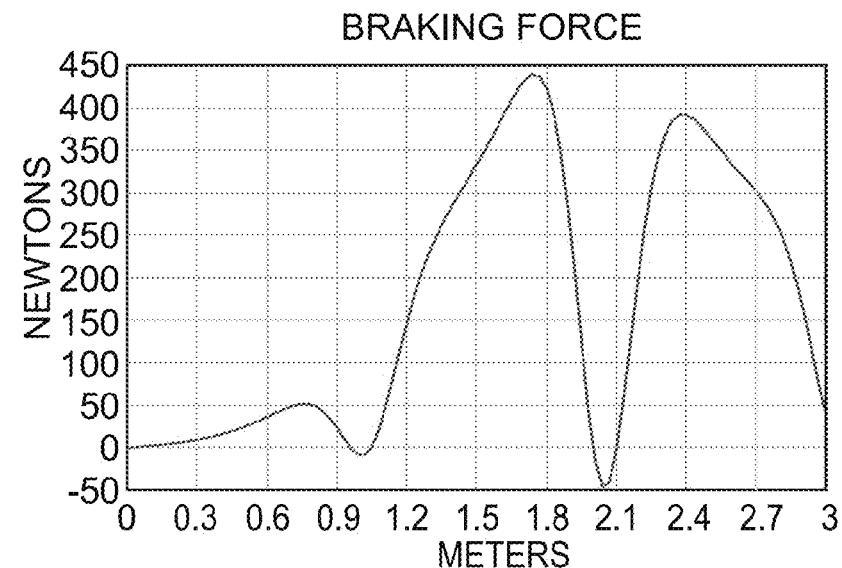
Figure 19:
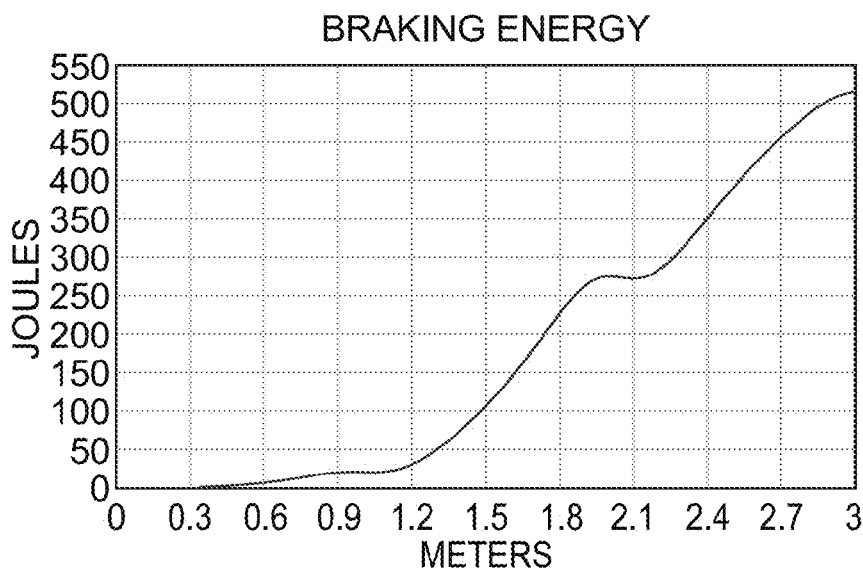
Figure 20:
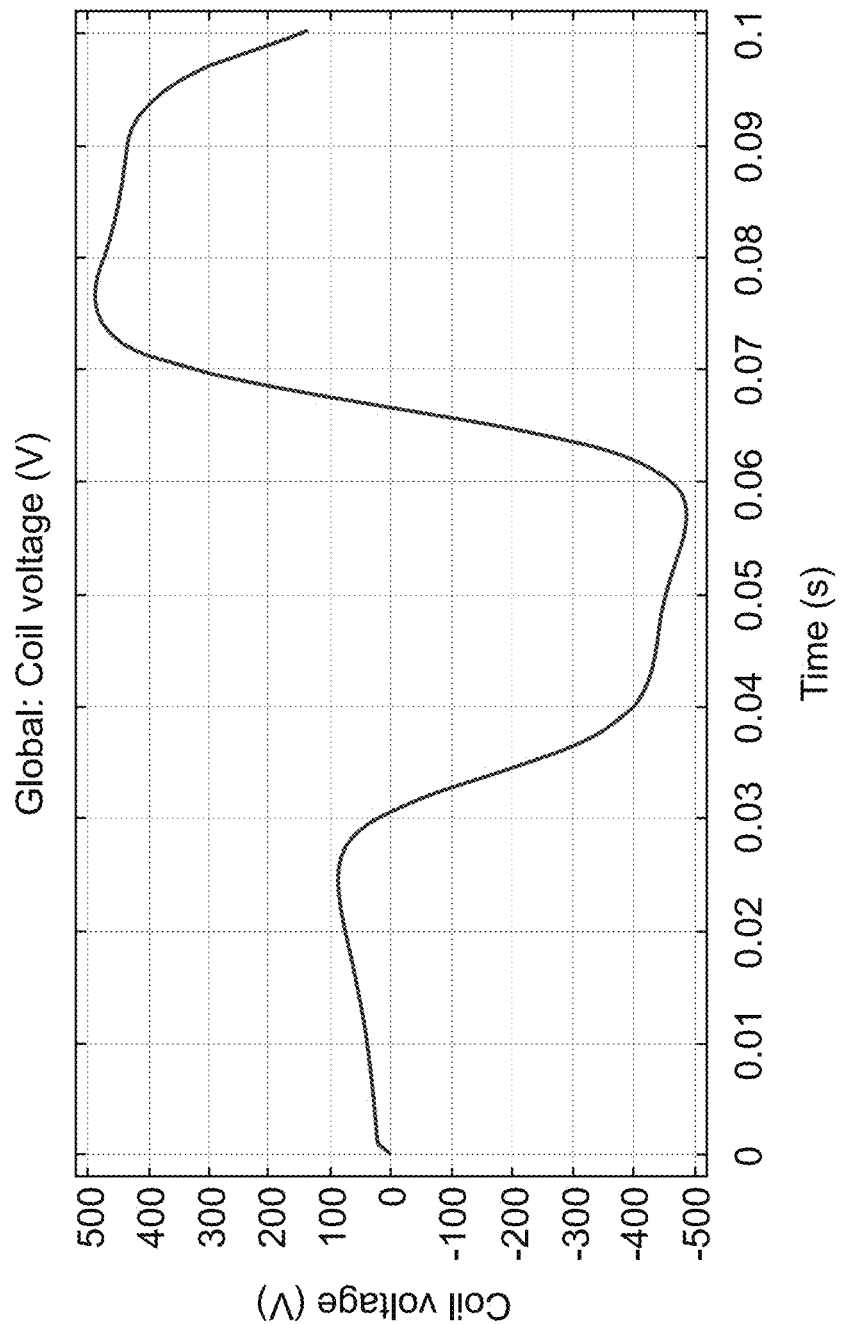
Figure 21:
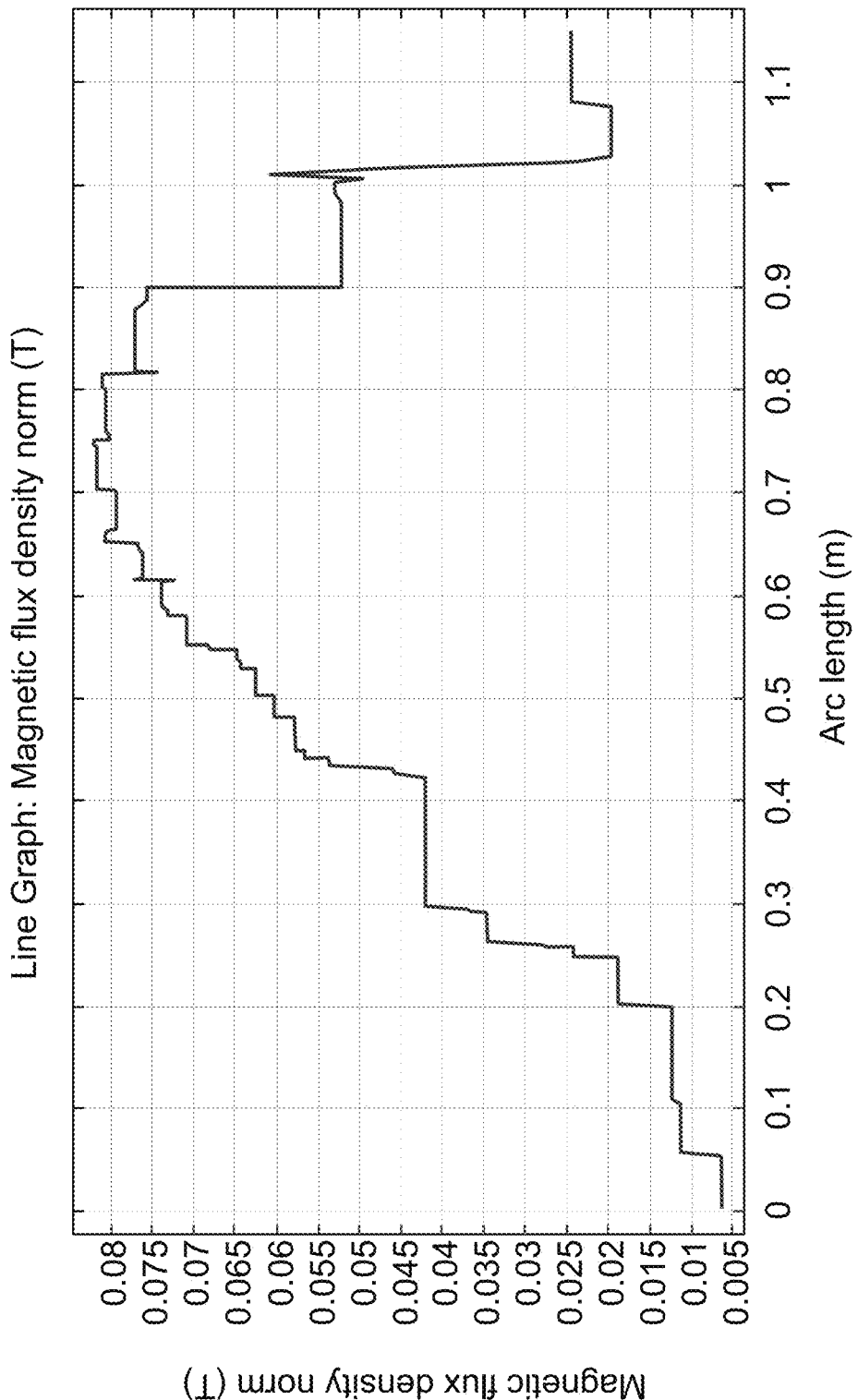

FIG. 13 is a graph showing simulations and carried out to model braking processes of the present embodiments and giving the results achieved;

FIG. 14 is a graph showing simulations and carried out to model braking processes of the present embodiments and giving the results achieved;

FIG. 15 is a graph showing simulations and carried out to model braking processes of the present embodiments and giving the results achieved;

FIG. 16 is a graph showing simulations and carried out to model braking processes of the present embodiments and giving the results achieved;

FIG. 17 is a graph showing simulations and carried out to model braking processes of the present embodiments and giving the results achieved;

FIG. 18 is a graph showing simulations and carried out to model braking processes of the present embodiments and giving the results achieved;

FIG. 19 is a graph showing simulations and carried out to model braking processes of the present embodiments and giving the results achieved;

FIG. 20 is a graph showing simulations and carried out to model braking processes of the present embodiments and giving the results achieved;

FIG. 21 is a graph showing simulations and carried out to model braking processes of the present embodiments and giving the results achieved.

Figure 22:
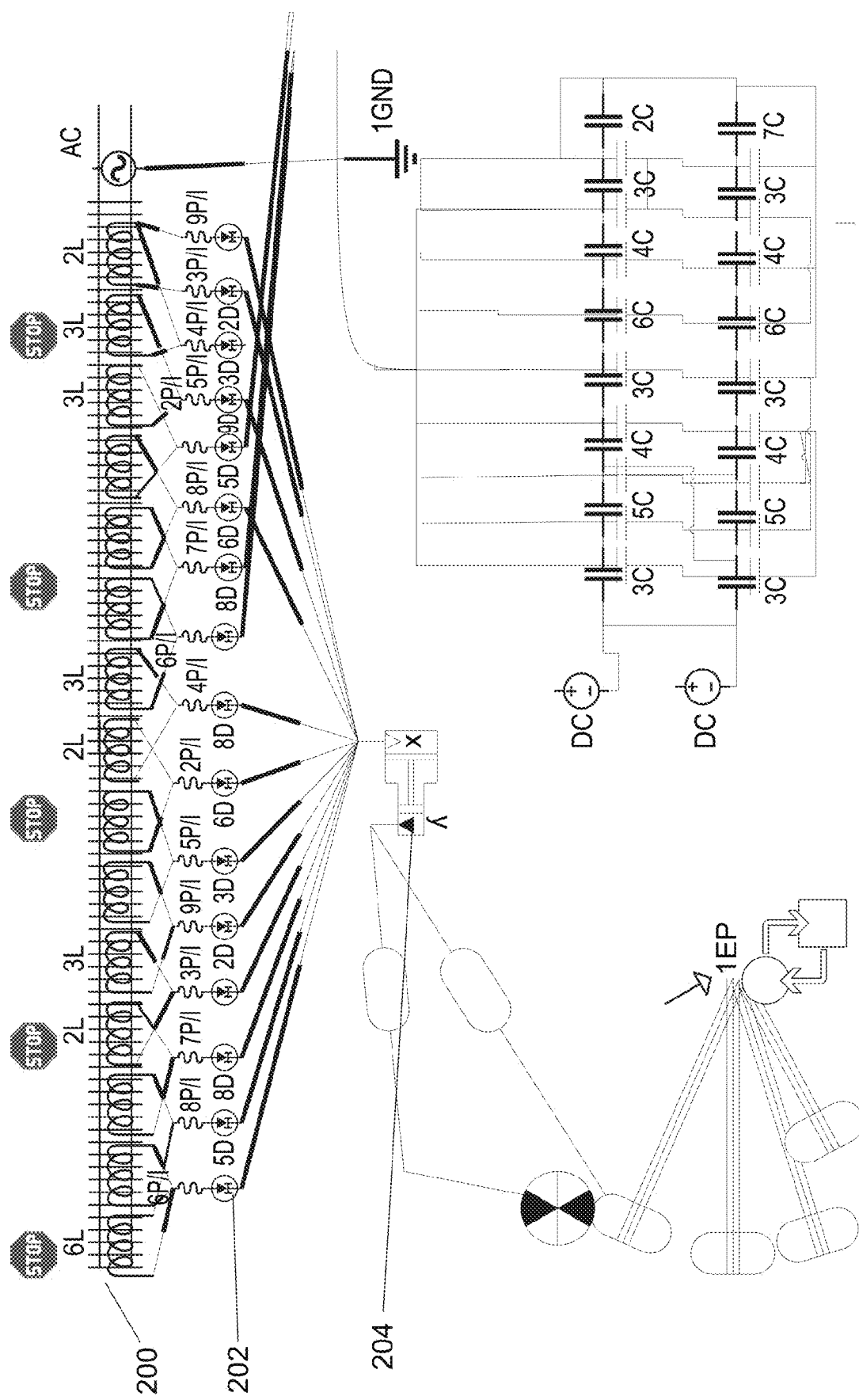
Figure 23:
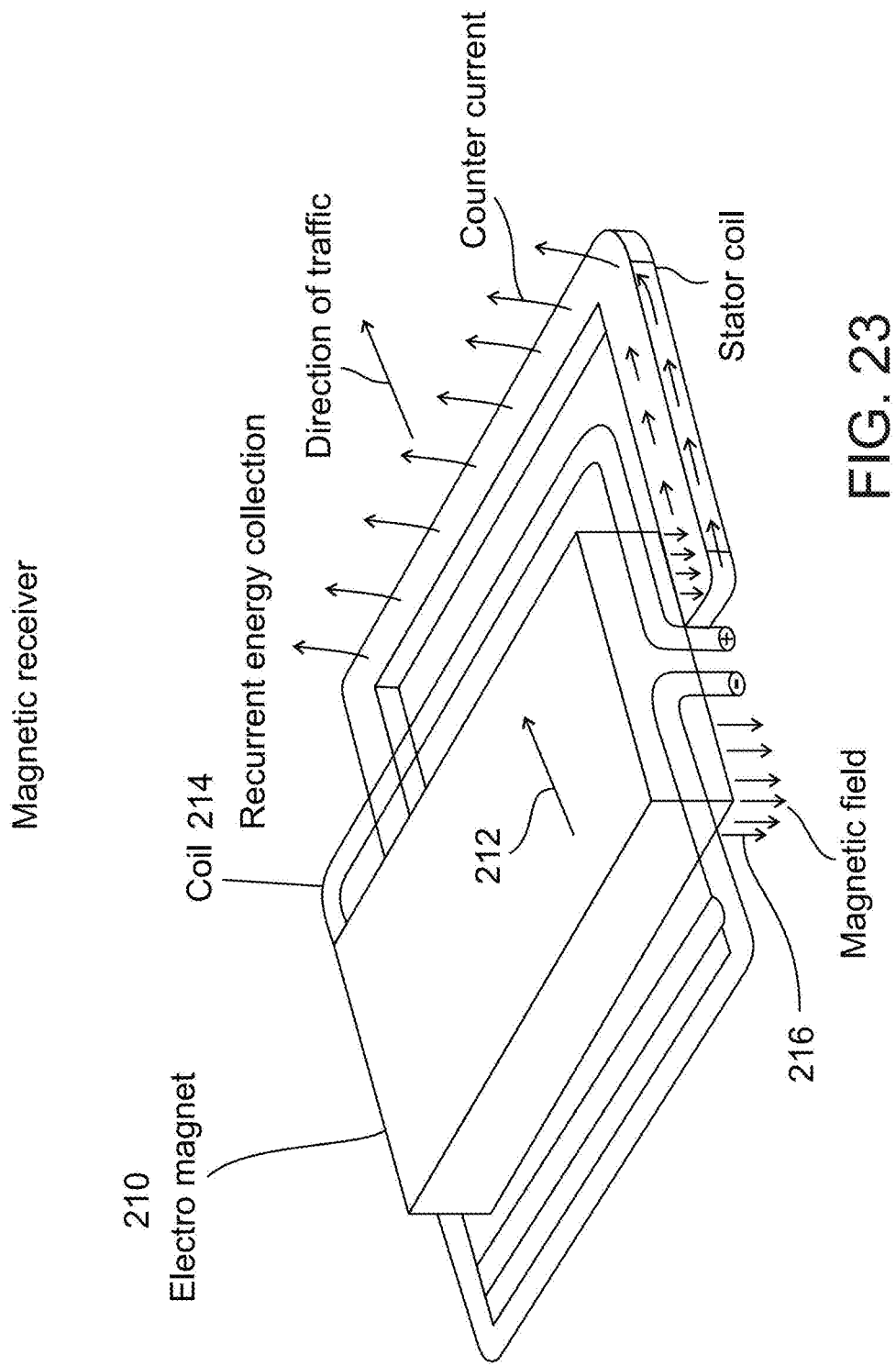

FIG. 22 is a simplified schematic diagram showing a schematic of an electrical layout for the part of the braking system of the present embodiments that is inside a vehicle; and FIG. 23 is a schematic diagram showing an electromagnet and coil and directions of forces.

DESCRIPTION OF SPECIFIC EMBODIMENTS OF THE INVENTION

The present invention, in some embodiments thereof, relates to a linear generator and, more particularly, but not exclusively, to the use of such a generator to generate electricity from momentum.

A linear generator for generating electrical power from momentum of a vehicle, comprises a moving part and a stator. The moving part is a powered vehicle moving along a defined path and the stator is built along the defined path.

Thus, the stator may subsequently be connected to an electrical system without any reference to the vehicle. The generator may damp the motion of the vehicle and thus use the motion of the vehicle to generate electricity.

Possible uses include trains, including passenger and goods trains, buses and elevators, and the linear generator may be used to help with braking and at the same time prevent waste of the energy from the vehicle momentum.

Braking may be automatic, thus automatically stopping trains at stations without intervention of the driver. Furthermore, use of the present system may be effective to reduce braking distance. For both of these reasons, the system of the present embodiments may serve as a safety system.

The braking system may work in different directions.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1:
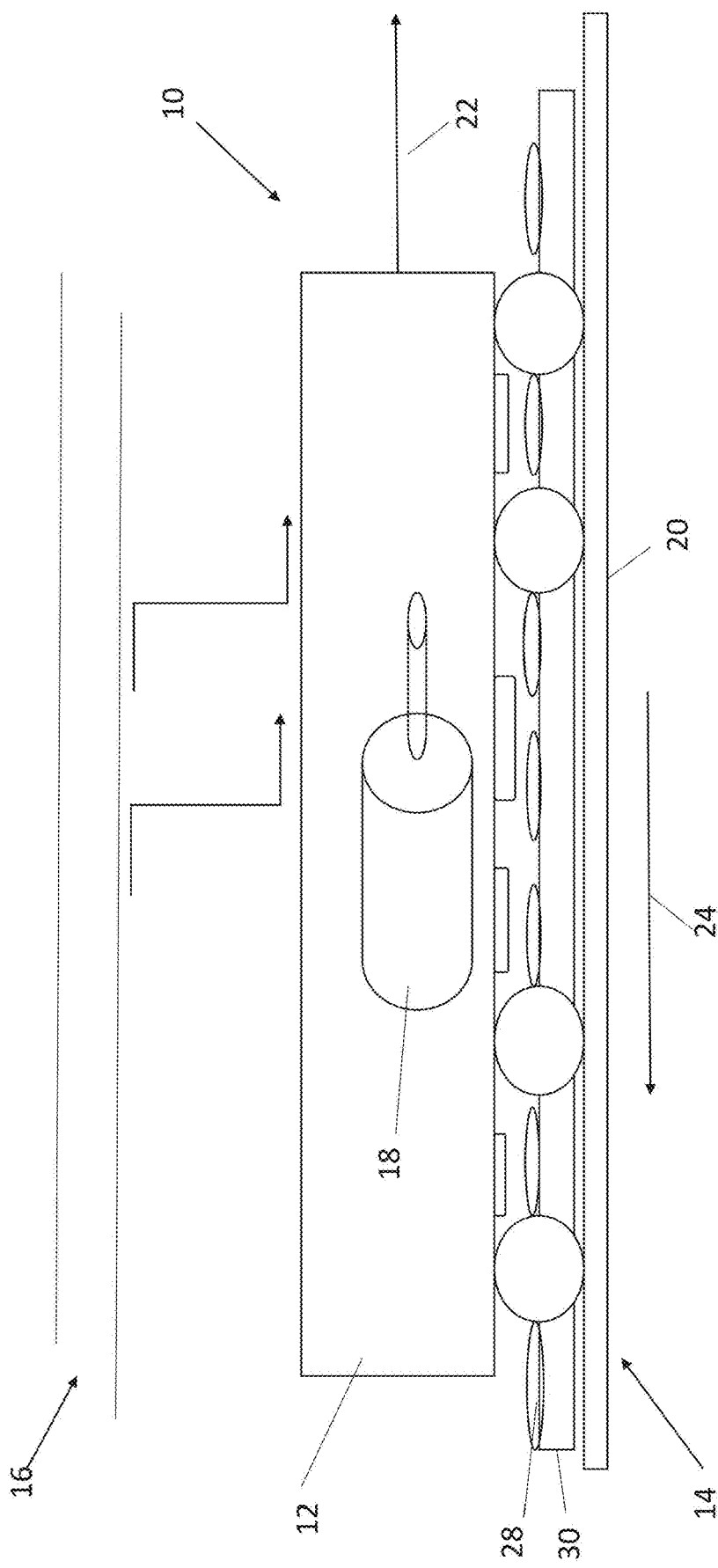

Referring now to the drawings, FIG. 1 illustrates a linear generator 10 for generating electrical power from momentum of a vehicle 12. The linear generator 10 has a moving part which is the vehicle 12, and a non-moving part which is the stator 14. The vehicle is a powered vehicle, and in general the vehicle is powered by a system that is independent of the linear generator. Thus for example vehicle 12 may be an electric train supplied with electricity from overhead cable 16 and driven by electric motor 18. The vehicle moves along a defined path such as railway track 20, and the stator is built along the defined path. The vehicle moves in the direction of arrow 22 with a certain momentum and the stator interacts to absorb some of the momentum and generate electricity, supplying a braking force in the direction of arrow 24.

The vehicle includes a sequence of magnets 26 on the side facing the track, which for a train would be the underside. The magnets may be electromagnets so that they can be energized when needed, say during braking, and the magnets may provide a sequence of alternating poles.

The stator comprises a series of wound coils 28 built into the track or raised from the track. The distance between the coils and the magnets are a design feature that the electrical engineer will wish to set to achieve optimal coupling and in one example the coils may optionally be placed on a raised third rail 30 as illustrated in FIG. 1.

Part or all of the system as built may be incorporated into a Faraday cage to prevent leak of flux and unwanted induction effects outside the confines of the braking system.

Coils may be square or round or figure of eight or any other suitable shape. Diodes may be used, as shown below in FIG. 22, for changing the directions of the current.

Figure 2:
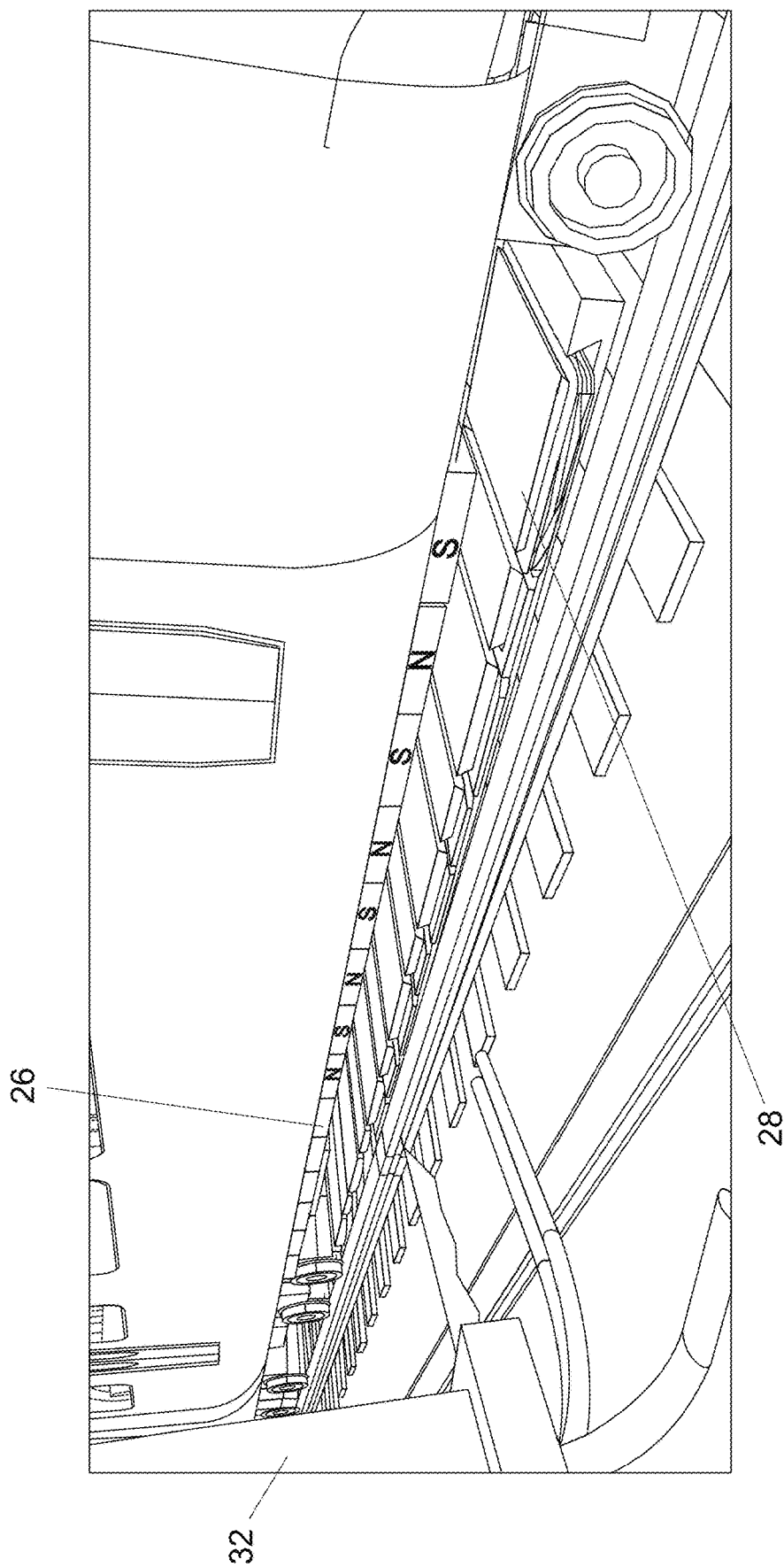
Figure 3:
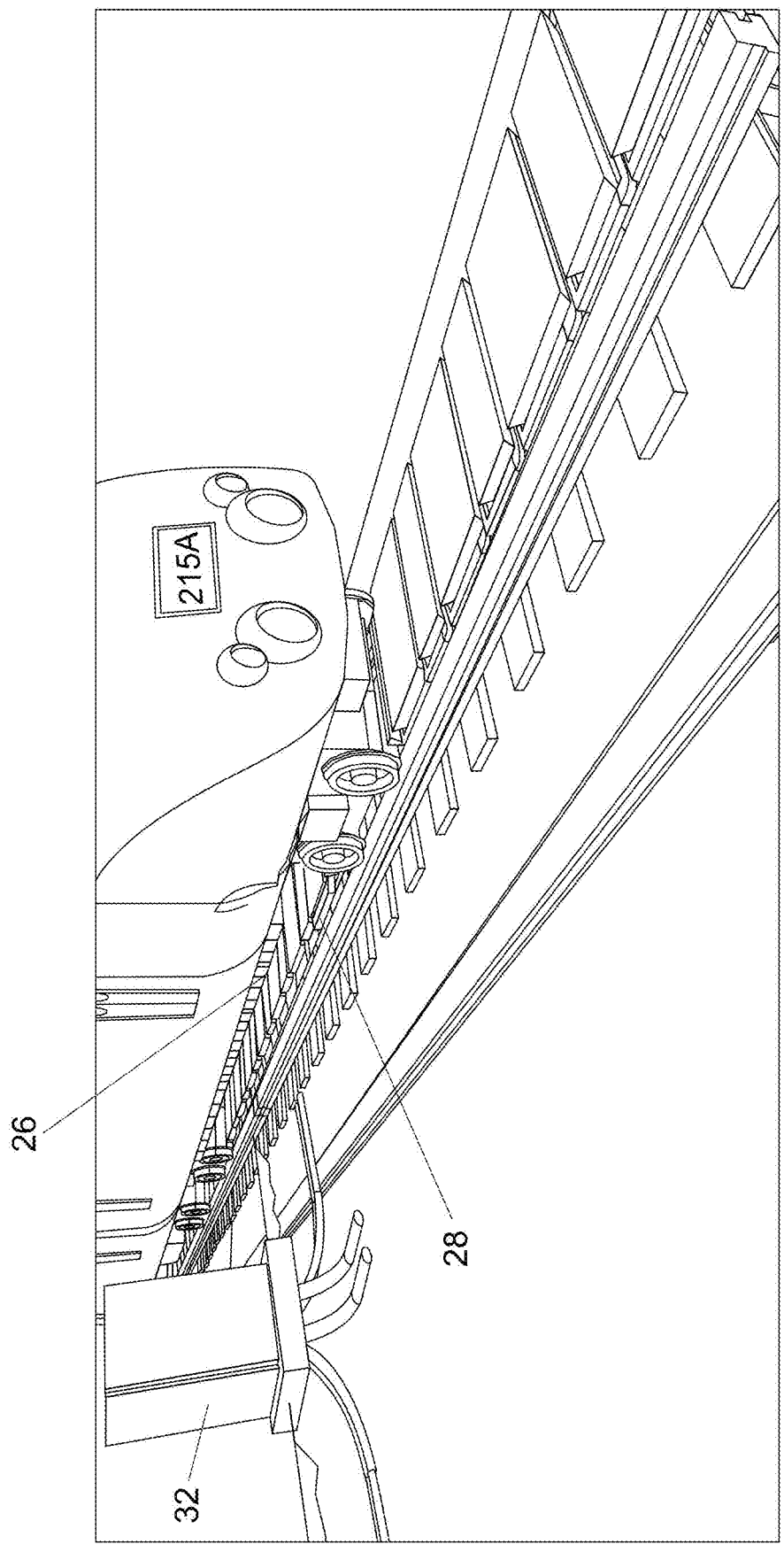

FIGS. 2 and 3 show side and front perspective views of the vehicle of FIG. 1 showing alternating poles of magnets on the underside of the train, and showing coils located on a stator in the middle of the track. The coils may be connected to outputs 32 which may in turn be connected to an electricity supply to which generated electricity from the coils may be provided. The outputs may include various circuitry for conditioning the generated electricity for output. Thus the frequency produced by the linear generator is likely to vary depending on the instantaneous speed of the vehicle. However the electricity supply requires a specific frequency. Thus the circuitry may make the necessary adjustments. In one embodiment an AC to DC converter transforms the input from the coils into DC and then a DC to AC convertor produces output at the desired frequency. In an alternative embodiment, a frequency converter may be used, either alone or in combination with other convertors.

Specifically, what FIGS. 2 and 3 show is part of a train that has a sequence of electromagnets on a side adjacent a track, and where the track faces the electromagnets with wound coils. The vehicle electrifies the electromagnets when braking to damp the motion of the train, generating electricity at the same time so that the momentum of the train is not lost.

Figure 4:
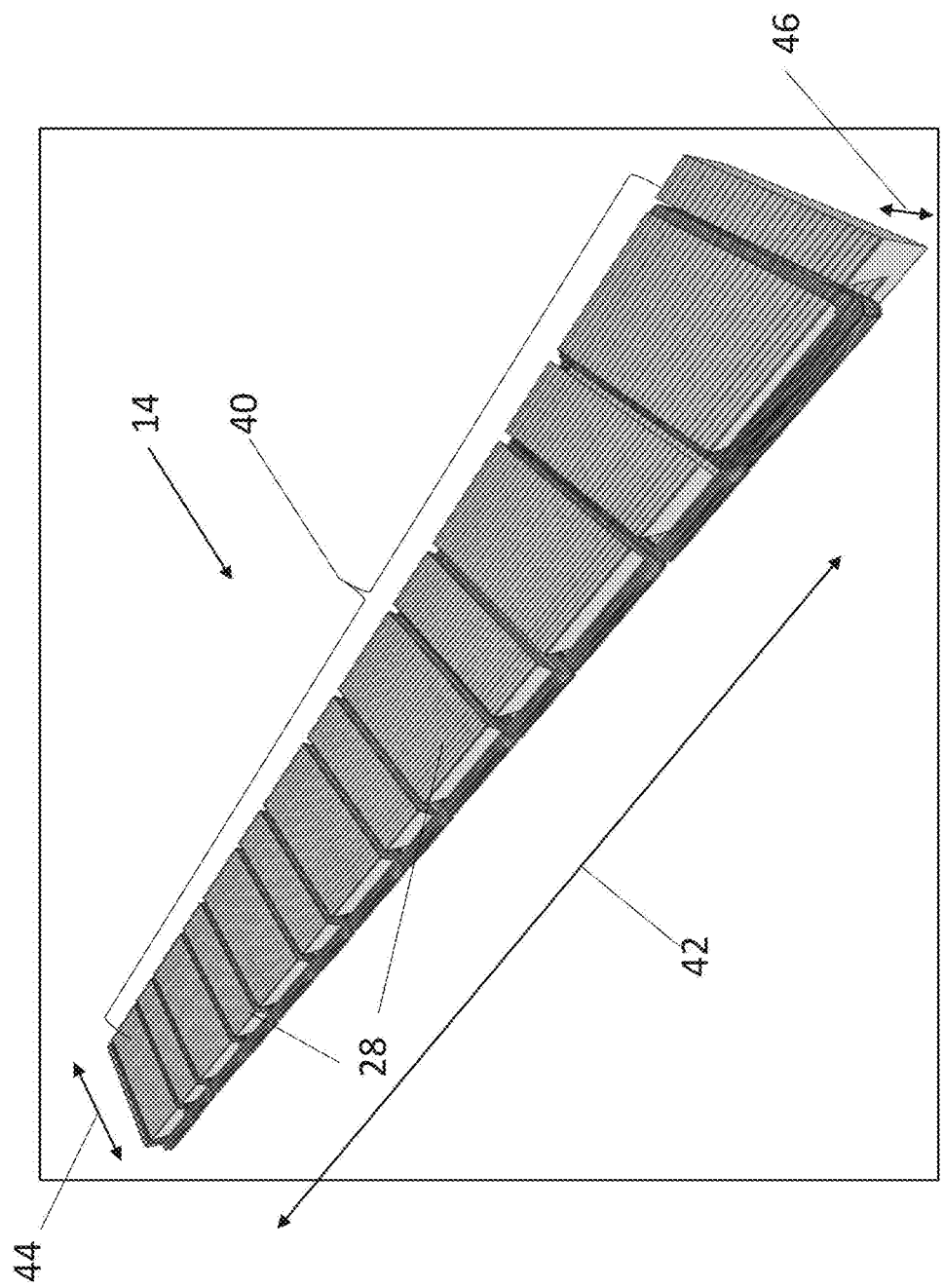

FIG. 4 is a simplified schematic diagram of the stator 14, as may be inserted or built into the track. The stator includes wound coils 26, which are set out linearly along the length of the track. In FIG. 4 the coils form a quasi-continuous surface 40 under the lower surface of the vehicle in the directions of travel—arrow 42, by contrast with the embodiment of FIG. 1 where the coils are separated by gaps. The coils may extend for most or all of the width of the vehicle across the track—arrow 44 and are flattened in the height direction—arrow 46—towards the vehicle.

Figure 5:
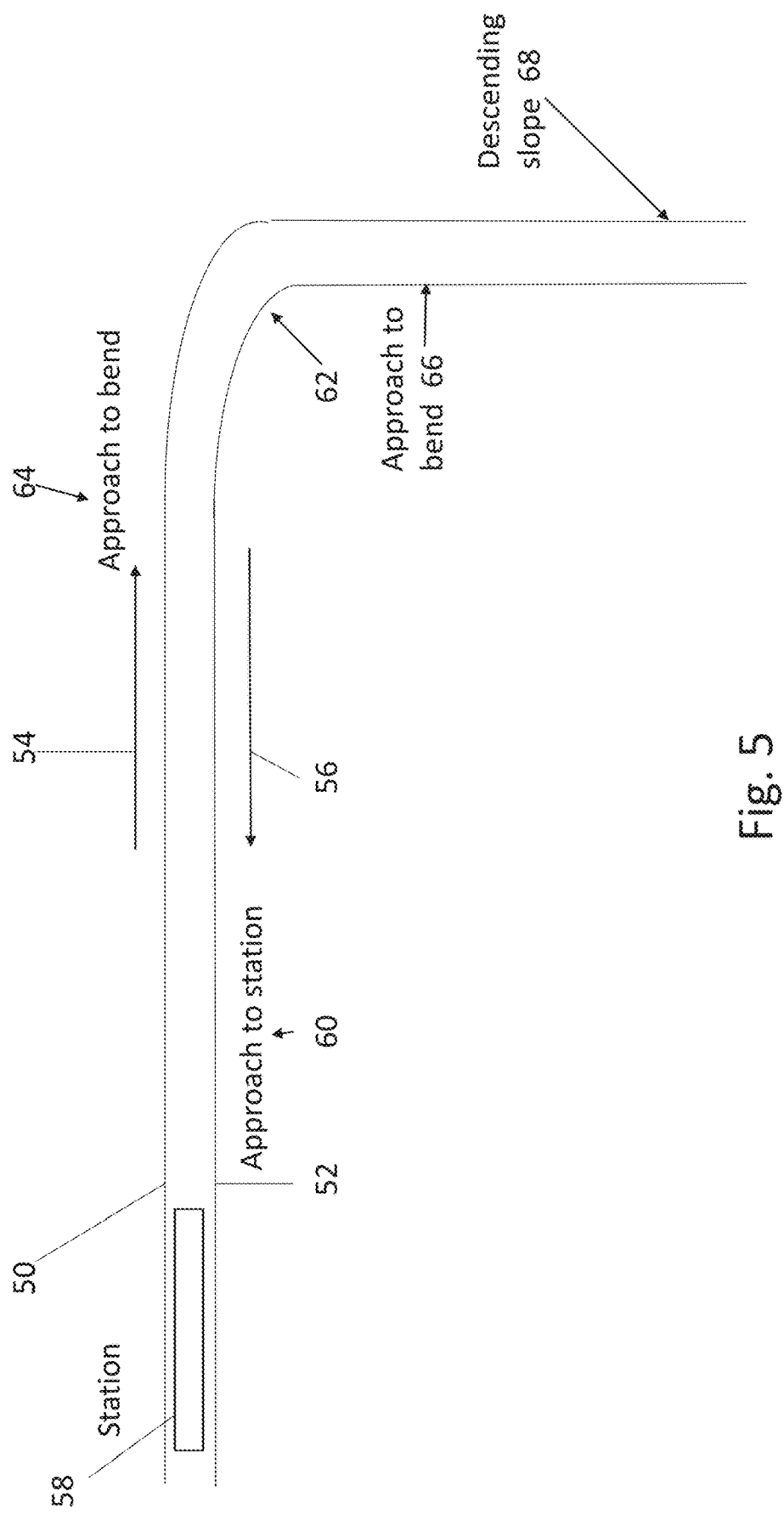

Reference is now made to FIG. 5, which is a simplified diagram showing a section of railway track and how it can be modified for use with the present embodiments. An up track 50 and down track 52 have directions of travel defined by arrows 54 and 56. A station 58 is located at one end of the track, and a station approach 60 is defined on the down line where trains are required to brake. A bend 62 in the track also defines approach regions 64 and 66 where braking is required. A descending slope 68 on the up line may also define a region where braking is required.

Thus the defined path, in this case a railway track, comprises a mixture of braking regions and non-braking regions, and the stator 14 may be constructed specifically in the braking regions. Outside of the braking regions, stator coils may be provided more sparsely or not provided at all.

Thus a railway track is shown where stator coils are built into braking regions of the track to assist trains with braking and generate electricity at the same time. The electricity may be provided to the general supply, or to the railway supply, or may be used for specific purposes such as powering lineside equipment or a nearby station.

Figure 6:
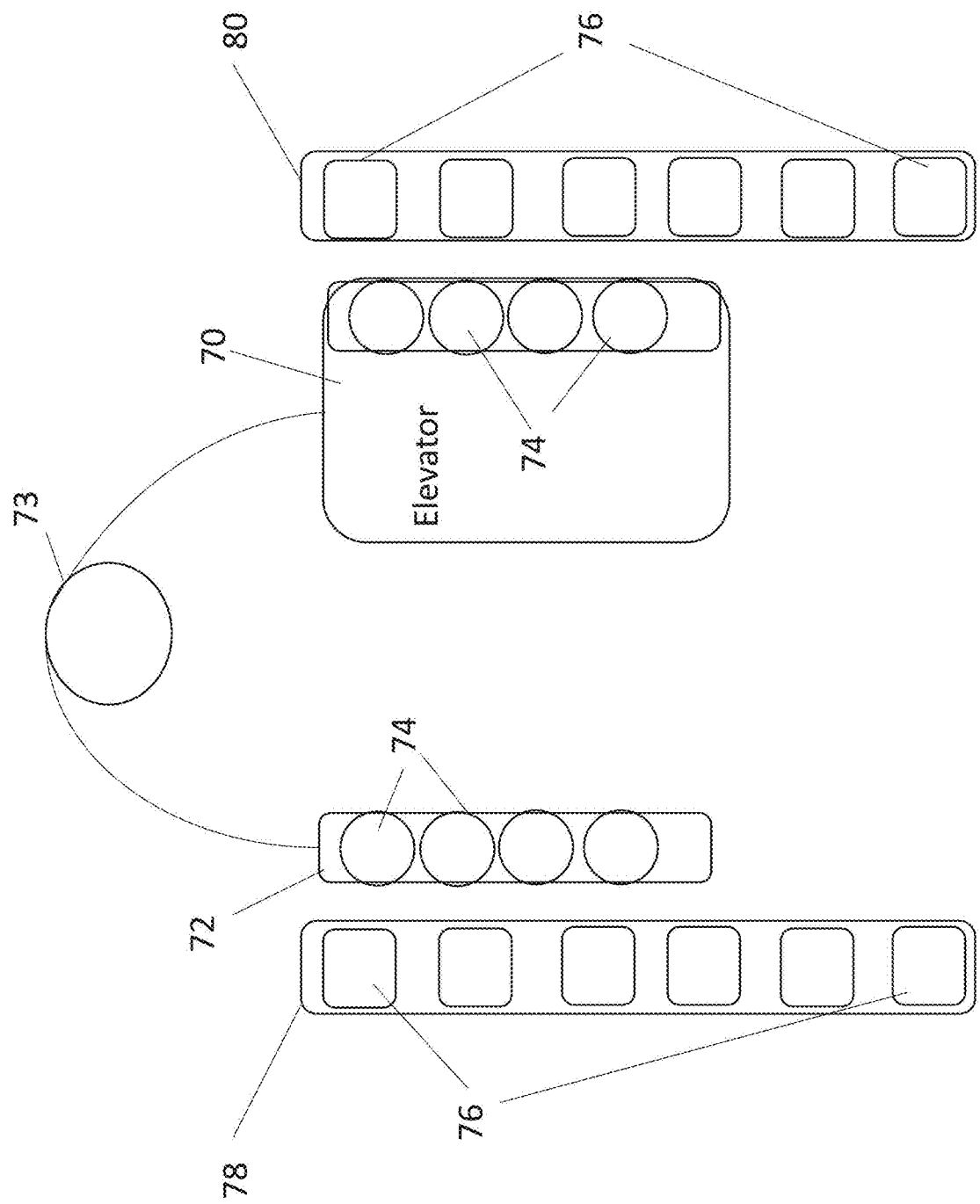

Reference is now made to FIG. 6, where the vehicle is an elevator 70 with a counterweight 72. The elevator is raised and lowered using motor 73 and needs to brake at any floor it is designed to stop at. The defined path is an elevator shaft. Magnets 74 may be placed on the counterweight 72 and/or on the elevator 70 and coils 76 may be placed on the walls 78 and 80 of the shaft. The coils may be placed all along the walls or may be restricted to defined braking areas if there are such areas.

Figure 7:
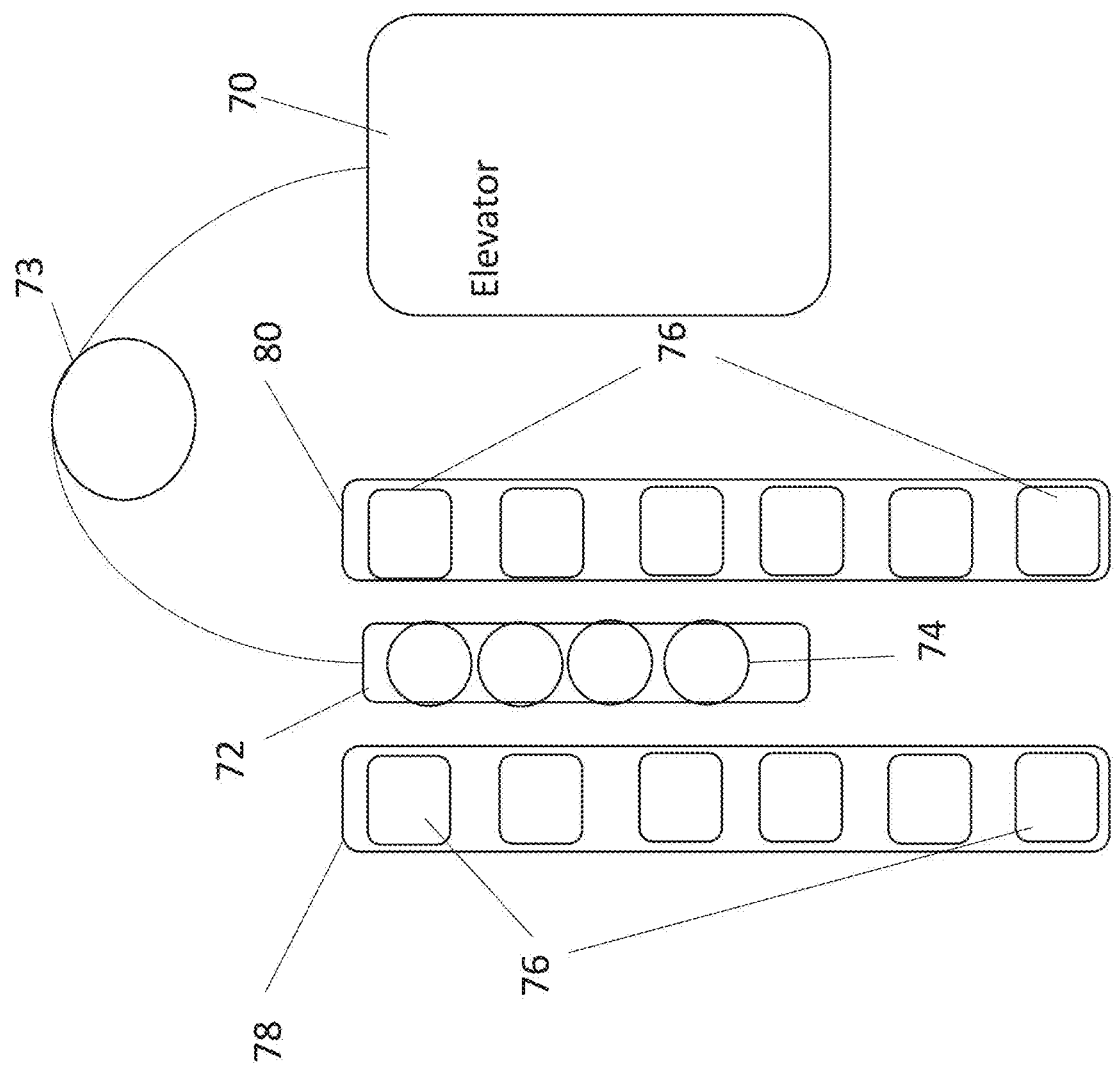

Reference is now made to FIG. 7, where the vehicle is a variation of the elevator 70 with a counterweight 72, of FIG. 6. The elevator is raised and lowered using motor 73 as before and needs to brake at any floor it is designed to stop at. The defined path is an elevator shaft. Magnets 74 may be placed on the counterweight 72 and coils 76 may be placed on the walls 78 and 80 of the shaft. As before, the coils may be placed all along the walls or may be restricted to defined braking areas if there are such areas.

Figure 8:
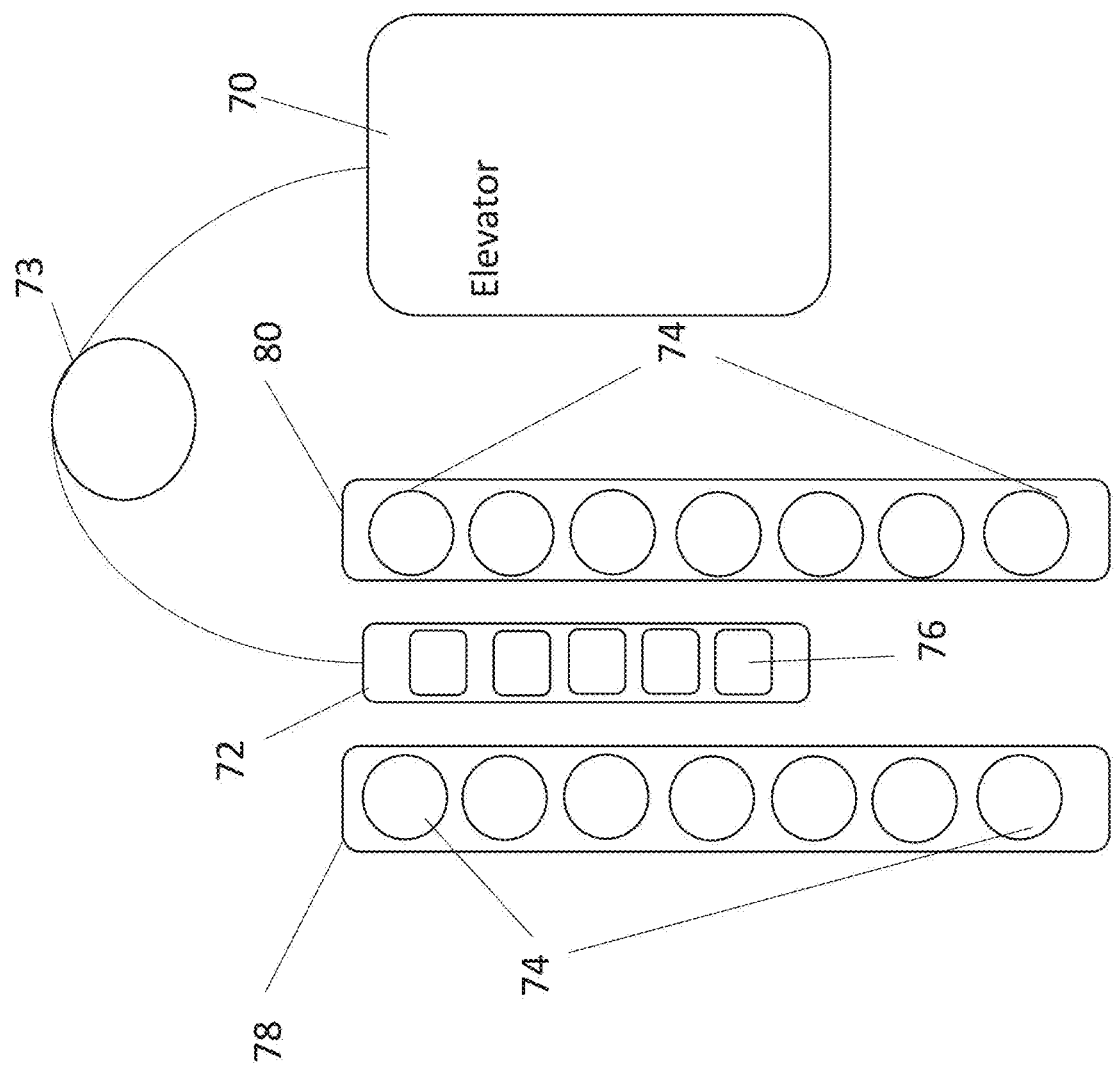

Reference is now made to FIG. 8, where the vehicle is a further variation of the elevator 70 with a counterweight 72, of FIG. 6. The elevator is raised and lowered using motor 73 as before and needs to brake at any floor it is designed to stop at. The defined path is an elevator shaft. Magnets 74 may be placed on the walls 78 and 80 of the shaft and coils 76 may be placed on the counterweight 72 as illustrated or on the elevator itself 70. The magnets may be placed all along the walls or may be restricted to defined braking areas if there are such areas.

Figure 9A:
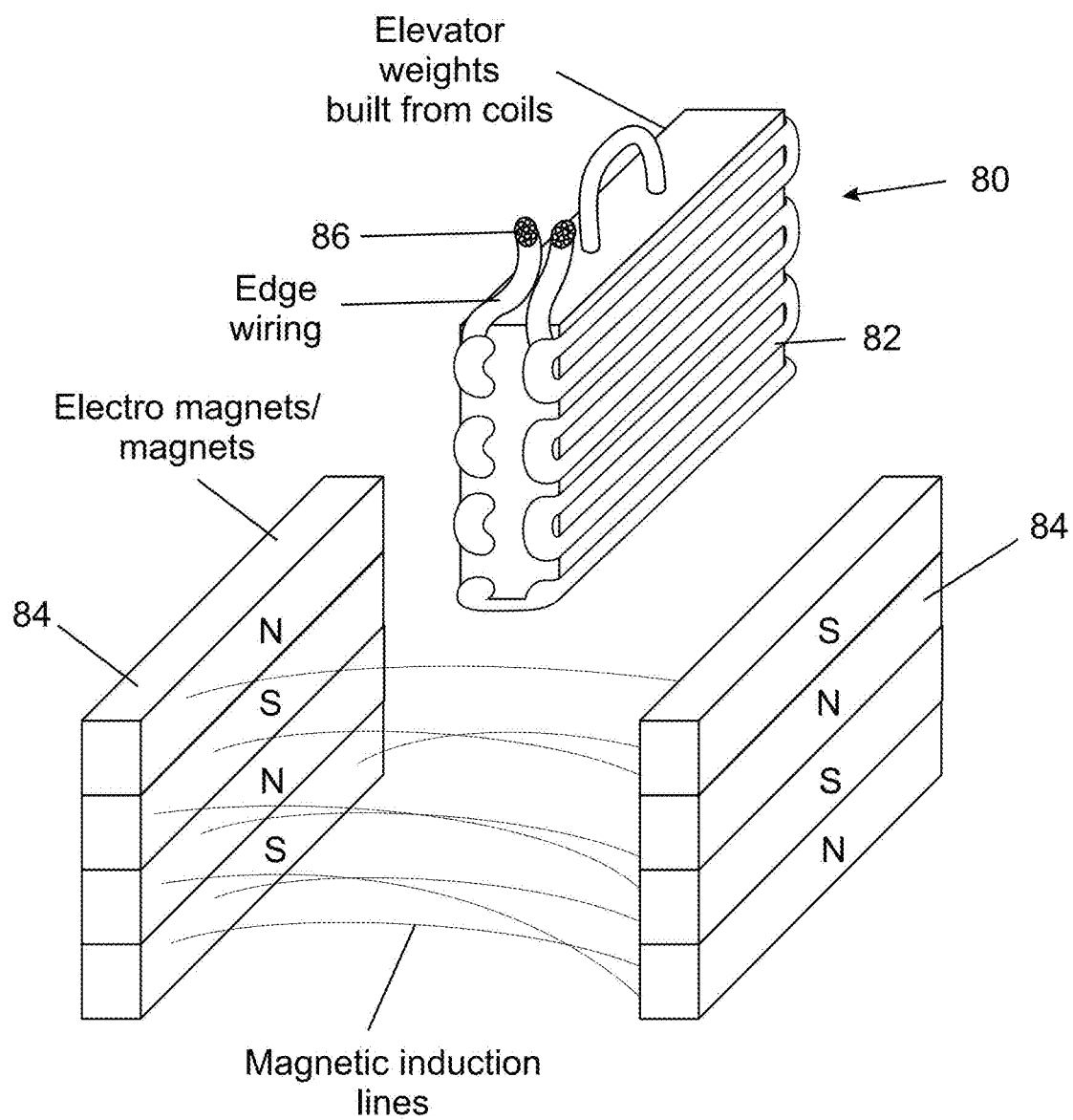

Reference is now made to FIG. 9A, which is a schematic diagram illustrating a counterweight 80 which is solely or mainly constructed from wound coils 82. The counterweight slides between magnets 84 built into the shaft wall. Magnetic field lines extend across the shaft and are cut by the counterweight, and thus brakes the motion of the counterweight. Electricity is generated in the coils and may be tapped from end wiring 86 for general utilization in the building. As before, the output may be processed by an AC to DC convertor and subsequently by a chopper to provide a desired frequency, or a direct frequency convertor may be used. The output may be tapped from the stator or the moving part, depending on where the coils are located.

As with the train embodiment, the elevator may electrify the electromagnets when braking and leave the electromagnets unenergized at other times so that the linear generator has no effect when braking is not required.

Figure 9B:
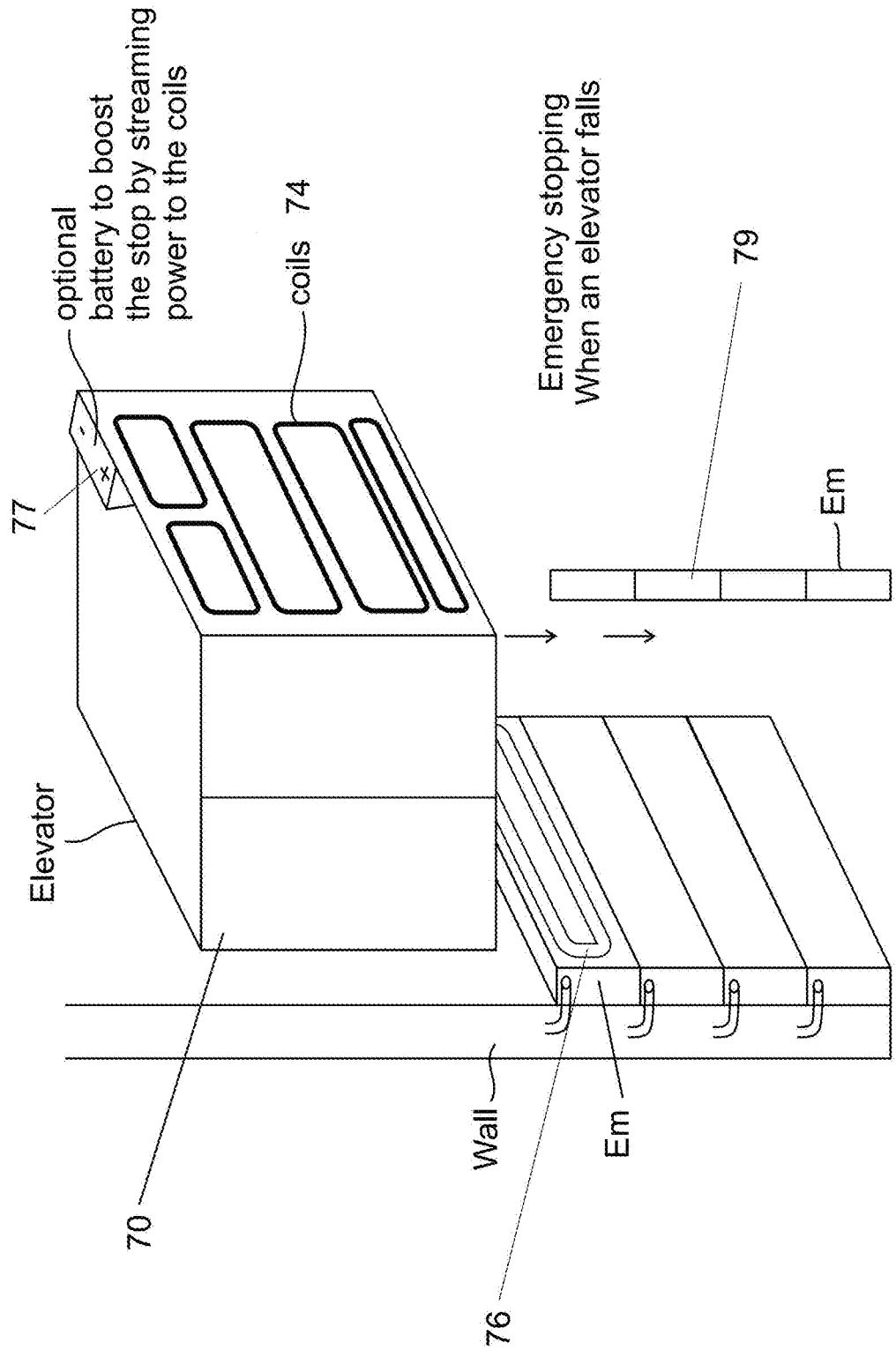

Reference is now made to FIG. 9B which shows a further variation of an elevator according to the present embodiments. The counterweight is not shown for simplicity. In FIG. 9B the elevator 70 is lowered down the lift shaft between electro-magnets 76 and needs to brake. Magnets 76 line the shaft and coils 74 are present in the elevator. An option is to provide battery 77 to energize the coils if needed. Additional magnets 79 may be provided at the lower part of the shaft as an emergency stop if the elevator fails.

Figure 10:
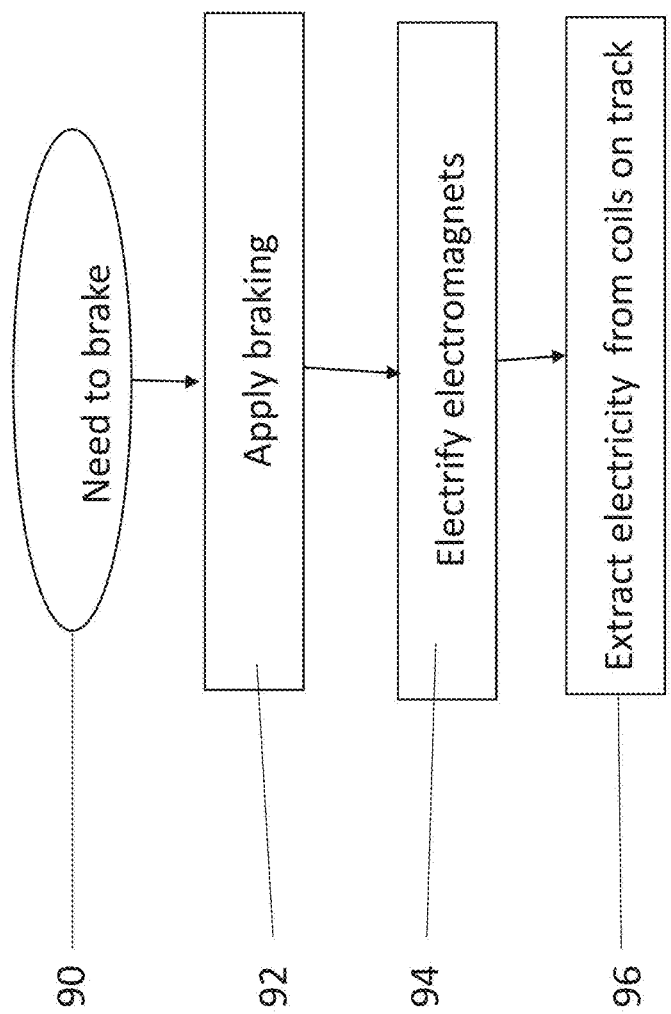

Reference is now made to FIG. 10, which is a simplified diagram showing a method of generating electricity and braking a vehicle at the same time. A vehicle is proceeding along a track—including a lift shaft or a railway track—and braking is required—90. Brakes are applied—92—and electromagnets are energized 94. The electromagnets run alongside wound coils of the stator along the track and energy is absorbed by the stator, braking the vehicle and at the same time generating electricity. The electricity may then be extracted from the coils and used as desired.

It is noted that the linear generator of the present embodiments may work together with an intrinsic braking system built into the vehicle. In one alternative the vehicle intrinsic braking system may be disabled when the linear generator is in operation. It is also possible to use the linear generator without an intrinsic vehicle braking system, but in that case the linear generator has to be provided along the whole length of the track, since unexpected incidents may occur and emergency braking may be needed at any time and at any location.

Reference is now made to FIG. 11 which illustrates a method of manufacturing a vehicle for running on a track and generating electricity in accordance with the present embodiments, or for that matter converting an existing vehicle. What is required is obtaining 100 the vehicle, selecting 102 the side of the vehicle that is adjacent the coils of the track, placing 104 a sequence of electromagnets on the selected side and connecting 106 the electromagnets so that they can be energized upon application of braking to the vehicle. That is to say the electromagnets may be connected to a voltage source by application of the vehicle brakes and disconnected from the voltage source when the brakes are not being applied.

A track may be constructed for use with the present embodiments as shown in FIG. 12. Firstly braking regions may be identified 110, such as the regions shown in FIG. 5. Then wound coils are placed in the braking regions 112, for example in the form of the stator of FIG. 4. The coil height is set so as to provide the desired coupling with the vehicle and the electromagnets thereon 114. Then conditioning circuitry may be connected to the output, depending on how it is intended to use the output. Thus as shown in 118, an AC→DC convertor may be followed by a DC→AC convertor to provide an output at a desired frequency irrespective of the input. Other solutions may be adopted as will be clear to the skilled person. The conditioning circuitry may for example be provided in lineside cabinets.

Now we consider a coil that is square and has side a and area $a^2 = A$

Thus the flux $\varphi = BA$

As the magnet passes, the flux in the coil rises from 0 to maximum in time $\Delta t$.

To an approximation, $\Delta t = 2 A/v$.

For an inductance L in the coil, and current I, $\varphi = LI$

The voltage V in the coil is given by:

$$V = \frac{d\Phi}{dt} \cong \frac{\Delta \Phi}{\Delta t} = \frac{L\Delta I}{\Delta t}$$

Thus we obtain:

$\Delta I = AB/L$

Ignoring losses:

$\Delta I \approx I$ \hfill (7)

The energy in the coil may be given by:

$$E = \frac{1}{2}LI^2 = \frac{1}{2}\frac{A^2 B^2}{L}$$

Inductance in a square loop of the coil may be given by:

$$L = \frac{\mu_0}{\pi} a$$

Hence for a=1 m, L=4.1710ρH
For B=1 T,
E=1.210×10⁵ J.

The current produced may reach 71 A. The voltage for the whole coil may be given by $$e = N\frac{d\phi}{dt}$$

Where,
e=instantaneous voltage
N=number of turns in the coil
φ=magnetic flux in Webers
t=time in seconds For a speed of 100 km/h and a field of 1 Tesla, the coil instantaneously produces 56 volts. The resistance of the coil is 3 milliOhm, causing a voltage drop of just 0.23V.

A small-scale prototype train was built with a sequence of magnets to run on a track with a built in stator as described above. The arrangement was tested and an AC output of 64 mA was obtained at 5 volts from one coil over four pulses. No attempt was made to bring the train to a halt.

In a further experiment, a different prototype train was built, again in miniature. Two copper coils without cores were placed on a flat surface, and four permanent magnets were placed on the train. The positioning and construction of the coils and magnets were altered during the course of the experiment. The train ran at between 5 and 8 km/h and the magnets passed at a distance of 10 mm from the coils.

The coils were connected in parallel, and the output from the coils at the time the magnets were passing over was measured. Measurements were taken both before and after fixing a 1 Ohm resistor as a load.

In one iteration of the experiment the magnets were 25×50×15 mm with a magnetization of 2013 Gauss. The coils were 20×90×60 mm and included 225 loops of 0.08 mm diameter copper wire. Resistance of the coil was 1.8 Ohms and a voltage of 5V was achieved.

When the load resistor was used, a 1.5V potential appeared across it.

It was clear that the voltage was increased by the speed of the train, the distance between the magnets and the coils and furthermore was increased when the coils were provided with cores.

Reference is now made to FIGS. 13-20 which show results of a simulation. The simulation was based on a magnet being 1 m square with height 200 mm. The copper coil was a meter square with 100 turns with a section of 1 square mm surrounding a core. Resistance of the coil was 6.50 hm. There was a 200 mm distance from the coil to the magnet. The magnet moved at 30 m/s for 0.1 S. The coil was compressed homogeneously into a pipe of 40 mm diameter.

FIG. 13 shows the magnetic field. The magnet is defined as 1 Tesla but in practice the field is about 0.7 Tesla and less in the center.

FIG. 14 shows the variation in magnetic field along a vertical line over the center of the magnet.

In the simulation, the presence of a core in the coil made relatively little difference.

FIG. 15 shows the voltage when the coil was not connected to anything. FIG. 16 shows the resulting current when the coil was connected across load.

FIG. 17 shows breaking force over time as applied to the train.

FIG. 18 shows breaking force over distance,

FIG. 19 shows the breaking energy in Joules over the distance in which breaking is applied.

FIG. 20 shows the coil voltage over the breaking time with a core included in the coil.

FIG. 21 shows magnetic flux density against arc length.

FIG. 22 is a schematic diagram showing a construction for a braking system for a train according to the present embodiments. As shown in the figure, a series of braking coils 200 are connected through diodes to provide a current rectified by rectifiers 202 and provided for use or collection at cell 204, which may be a battery or an electrolysis cell or any other unit capable of storing energy.

FIG. 23 is a simplified schematic diagram showing a magnet passing a coil and generating a current while being braked, as used in the present embodiments. Electromagnet 210 moves in the direction of arrow 212 over coil 214. A magnetic field is produced in the direction indicated by arrows 216. Current is induced in the coil in an anti-clockwise direction.

In the following are exemplary calculations for braking power and recoverable energy for different types of vehicles.

1) Passenger train
   A carriage of 57 tonnes travelling at 80 km/h represents 14.4 MegaJoules. A 40 kg coil creates 5 kiloJoules per pulse. For 15 pulses and 200 coils a braking energy of 15 Megajoules is possible over 200 m. 75 kiloVolts per coil multiplied by 200 coils equates to 15 MegaVolts and 150 kiloAmps over a duration of some 15 seconds.

2) A tram or urban light railway train
   A train of 70 meters in length weighs approximately 160 tonnes and requires stopping power of 40 Mega-Joules to come to a halt from 80 km/h. The model referred to above provides 500 Joule and 50 Amps from a meter square coil with 100 loops and a cross section of 1 mm for a single pulse when the coil is 200 mm from a 1 T magnet and there is 10% efficiency in practice.
   Thus 40 Kg of copper coil per meter (1000 loops with cross section 1 mm) provided over 160 m, and using 50 pulses may provide 40 MJ of stopping energy. 6400 kg of copper would be required.

3) Bus
   A bus of weight 19 tonnes travelling at 80 km/h requires 4.8 MegaJoules to come to a halt. Thus would require an arrangement of coils having a weight of 40 kg/m spread over 120 m. Over 8 pulses this would create 4.8 MegaJoules.

4) Elevator/lift.
   An elevator weighing 1.8 tonnes being lowered from a height of 60 m—approx. ten stories—requires a stopping force of 1 MegaJoule at the bottom of the lift-shaft. Such an stopping force could be achieved by placing of copper coils around the shaft over the last 25 meters.

It is expected that during the life of a patent maturing from this application many relevant vehicle and braking technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A linear generator for generating electrical power from momentum of a vehicle, the linear generator comprising a moving part and a stator, wherein the moving part is a powered vehicle moving along a defined path and the stator is built along the defined path, both the moving part and the stator of the linear generator being incorporated at least partly into a Faraday cage, thereby to prevent leak of flux.

2. A linear generator for generating electrical power from momentum of a vehicle, the linear generator comprising a moving part and a stator, wherein the moving part is a powered vehicle moving along a defined path and the stator is built along the defined path, the linear generator further comprising at least one convertor configured to convert a frequency dependent on an instantaneous vehicle speed into a fixed output frequency, both the moving part and the stator of the linear generator being incorporated at least partly into a Faraday cage, thereby to prevent leak of flux.

3. The linear generator of claim 1, wherein the moving part comprises a sequence of magnets and the stator comprises wound coils.

4. The linear generator of claim 3, wherein said magnets are electromagnets and said powered vehicle is an electrically powered vehicle.

5. The linear generator of claim 3, wherein the sequence of magnets are arranged on the vehicle to pass over at a predetermined distance from said wound coils.

6. The linear generator of claim 3, wherein the sequence of magnets are of alternating polarity.

7. The linear generator of claim 1, wherein said defined path comprises braking regions and non-braking regions, and said stator is built into said braking regions and not built into said non-braking regions.

8. The linear generator of claim 1, wherein said vehicle comprises a train and said defined path is a railway track.

9. The linear generator of claim 1, wherein said vehicle is an elevator, or an elevator with a counterweight, and said defined path is an elevator shaft.

10. The linear generator of claim 1, wherein said vehicle is an elevator counterweight and said defined path is an elevator shaft.

11. The linear generator of claim 1, wherein the stator comprises an AC to DC convertor to provide a DC output.

12. The linear generator of claim 1, wherein said power generated from said braking is used in electrolysis to produce hydrogen.

13. The linear generator of claim 1, wherein the moving part comprises a sequence of electromagnets and the stator comprises wound coils and the vehicle is configured to electrify the electromagnets when braking.

14. An elevator and counterweight system in an elevator shaft, wherein the elevator or the counterweight comprise electromagnets and the elevator shaft has coils, and wherein the elevator is controllable to electrify the electromagnets when braking, thereby to provide electromagnetic braking of the elevator and counterweight system, the elevator and counterweight system comprising a linear generator, the electromagnets and coils of the linear generator all being incorporated at least partly into a Faraday cage, thereby to prevent leak of flux.

15. A method of manufacture of a track for a vehicle, the method comprising:
identifying braking regions on said track where braking is likely to be required;
placing wound coils on said braking regions;
connecting said coils to output electricity generated therein; connecting an AC to DC converter and a DC to AC converter between said coils and said output; and
arranging said track and said coils such that a linear generator is formed between said coils and magnets on said vehicle, both the coils and the magnets of the linear generator being incorporated at least partly into a Faraday cage, thereby to prevent leak of flux.

* * * * *